(12) United States Patent
Luxsuwong et al.

(10) Patent No.: US 11,880,598 B2
(45) Date of Patent: Jan. 23, 2024

(54) REQUEST MANAGER FRAMEWORK

(71) Applicant: EMC IP Holding Company LLC, Hopkinton, MA (US)

(72) Inventors: Peerapat Luxsuwong, Brighton, MA (US); Sathya Krishna Murthy, Morrisville, NC (US); Charles Christopher Bailey, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 208 days.

(21) Appl. No.: 17/370,195

(22) Filed: Jul. 8, 2021

(65) Prior Publication Data

US 2023/0010240 A1   Jan. 12, 2023

(51) Int. Cl.
 *G06F 3/06* (2006.01)

(52) U.S. Cl.
 CPC ............ *G06F 3/0659* (2013.01); *G06F 3/061* (2013.01); *G06F 3/0676* (2013.01); *G06F 3/0679* (2013.01)

(58) Field of Classification Search
 CPC ...... G06F 3/0659; G06F 3/061; G06F 3/0676; G06F 3/0679; G06F 3/067
 See application file for complete search history.

(56) References Cited

U.S. PATENT DOCUMENTS

| | | | |
|---|---|---|---|
| 6,076,148 A | 6/2000 | Kedem et al. | |
| 9,507,798 B1 | 11/2016 | Zhao et al. | |
| 10,614,019 B2 | 4/2020 | Nishimoto et al. | |
| 10,782,997 B1 | 9/2020 | Krishna Murthy et al. | |
| 11,140,183 B2 | 10/2021 | Douglas et al. | |
| 11,513,720 B1* | 11/2022 | A | ........................ G06F 12/0253 |
| 2017/0123972 A1* | 5/2017 | Gopinath | .............. G06F 3/0616 |

* cited by examiner

*Primary Examiner* — Charles Rones
*Assistant Examiner* — Han V Doan
(74) *Attorney, Agent, or Firm* — BainwoodHuang

(57) ABSTRACT

Techniques for managing sequencing requests for storage node operations based on types of operations being sequenced. The techniques manage sequencing requests for different types of operations, such as backup and recovery operations, replication operations, migration operations, and so on, in a manner that avoids overwhelming storage node capacity. The techniques include receiving a sequencing request for an operation of a specified operation type at a request manager of a storage node and determining whether a capacity of the storage node is available for running the operation by a capacity manager for the specified operation type, in which the capacity manager is provided by a storage client and implemented on the storage node separate from the request manager. In this way, throttling, limiting, and/or prioritization requirements of the operation of the specified operation type can be defined by the storage client in a manner agnostic to the request manager.

20 Claims, 7 Drawing Sheets

REQUEST MANAGER FRAMEWORK

BACKGROUND

Clustered storage systems (also referred to herein as "storage cluster(s)") employ various techniques to distribute and maintain data and/or metadata among storage processors (also referred to herein as "storage nodes") within the storage clusters. The storage nodes service storage-related input/output (IO) commands issued over a network by client computers (also referred to herein as "storage clients"). The IO commands (e.g., read commands, write commands) direct the storage nodes to write or read storage objects such as data pages, data blocks, or data files to/from storage targets such as logical units (LUs), volumes (VOLs), or file systems. The storage nodes apply policy-based data protection rules to the storage objects to generate point-in-time (PIT) snapshots of the storage objects, as well as replicate data and/or metadata to other storage nodes or systems.

SUMMARY

Policies governing data protection rules can be time-based and allow for establishment of recovery point objectives (RPOs), which can determine a maximum age of storage objects and specify how often they should be copied or replicated. In accordance with such policies, storage nodes can schedule data protection rules for execution at various time intervals to assure that the established RPOs are met. This can be problematic, however, when certain time intervals for executing data protection rules applied to storage objects overlap, resulting in increased amounts of concurrent operations that can overwhelm capacities of the storage nodes. One approach to addressing this problem involves employing throttling or limiting techniques, which typically maintain counts of in-progress operations and, when storage node capacity becomes available, select among multiple queued operations to run based on a priority schema (e.g., high, medium, and low with priority aging). Such an approach can also be problematic, however, because it tends not to be operation type-specific. For example, RPOs can be established for various types of operations, such as data backup and recovery operations, data replication operations, data migration operations, and so on, each of which can have its own throttling, limiting, and/or prioritization requirements. However, typical throttling or limiting techniques are generally incapable of satisfying such operation type-specific data protection needs.

Techniques are disclosed herein for managing sequencing requests for storage node operations based on types of operations being sequenced. The disclosed techniques can manage sequencing requests for different types of operations, such as backup and recovery operations, replication operations, migration operations, and so on, in a manner that avoids overwhelming storage node capacity. The disclosed techniques can employ a request manager framework that defines an object model of a request manager service, including a set of abstract classes and associated methods or functions to support the object model. The request manager framework can be implemented on a storage node of a storage cluster. The disclosed techniques can further employ, for each operation type (e.g., backup/recovery, replication, migration), a capacity manager plugin or application programming interface (API) and a sequencing request repository and persister plugin or API, each of which can be provided by a storage client and implemented on the storage node. The storage client can provide the capacity manager plugin (or API) to define rules for managing storage node capacity for the operation type. The storage client can further provide the sequencing request repository/persister plugin (or API) to define capabilities and/or priorities for managing persistence of sequencing requests for the operation type. Each of the capacity manager plugin (or API) and the sequencing request repository/persister plugin (or API) can be implemented on the storage node separate from a request manager, which, as a result, can be agnostic with respect to the operation type-specific rules, capabilities, and/or priorities defined by the storage client. The disclosed techniques can include receiving, at the storage node from the storage client, a first sequencing request for a first operation of a specified type, and determining, by the storage node, whether capacity is available for running the first operation of the specified type based at least on rules for managing storage node capacity defined by the storage client. The disclosed techniques can further include, in response to determining that the capacity is available, granting the first sequencing request for the first operation of the specified type. The disclosed techniques can further include receiving, at the storage node from the storage client, a second sequencing request for a second operation of the specified type, and determining, by the storage node, whether capacity is available for running the second operation of the specified type based at least on the rules for managing storage node capacity defined by the storage client. The disclosed techniques can further include, in response to determining that the capacity is not available, postponing granting the second sequencing request for the second operation of the specified type until the capacity for running the second operation of the specified type is determined to be available.

By receiving a sequencing request for an operation of a specified operation type at a request manager of a storage node and determining whether a capacity of the storage node is available for running the operation by a capacity manager for the specified operation type, in which the capacity manager is provided by a storage client and implemented on the storage node separate from the request manager, throttling, limiting, and/or prioritization requirements of the operation of the specified operation type can be defined by the storage client in a manner agnostic to the request manager.

In certain embodiments, a method of managing sequencing requests for storage node operations incudes receiving a first sequencing request for a first operation of a specified first operation type at a request manager of a storage node and determining whether a capacity of the storage node is available for running the first operation by a first capacity manager for the specified first operation type. The first capacity manager is provided by a storage client and implemented on the storage node separate from the request manager. The method further includes, in response to determining that the capacity of the storage node is available for running the first operation, granting the first sequencing request for the first operation of the specified first operation type. The method further includes, in response to determining that the capacity of the storage node is not available for running the first operation, postponing granting the first sequencing request for the first operation of the specified first operation type.

In certain arrangements, the method further includes writing a persistent record of the first sequencing request to a repository for the specified first operation type.

In certain arrangements, the method further includes receiving a second sequencing request for a second operation of the specified first operation type at the request manager of the storage node.

In certain arrangements, the method further includes writing a persistent record of the second sequencing request to the repository for the specified first operation type.

In certain arrangements, the method further includes releasing the capacity of the storage node for running the first operation by the first capacity manager for the specified first operation type.

In certain arrangements, the method further includes, in response to releasing the capacity of the storage node for running the first operation, obtaining the persistent record of the second sequencing request from the repository for the specified first operation type.

In certain arrangements, the method further includes determining whether capacity of the storage node is available for running the second operation by the first capacity manager for the specified first operation type.

In certain arrangements, the method further includes, in response to determining that the capacity of the storage node is available for running the second operation, granting the second sequencing request for the second operation of the specified first operation type.

In certain arrangements, the method further includes, in response to determining that the capacity of the storage node is not available for running the second operation, postponing granting the second sequencing request for the second operation of the specified first operation type.

In certain arrangements, the method further includes receiving a second sequencing request for a second operation of a specified second operation type at the request manager of the storage node.

In certain arrangements, the method further includes writing a first persistent record of the first sequencing request to a first repository for the specified first operation type and writing a second persistent record of the second sequencing request to a second repository for the specified second operation type.

In certain arrangements, the method further includes determining whether capacity of the storage node is available for running the second operation by a second capacity manager for the specified second operation type. The second capacity manager is provided by the storage client and implemented on the storage node separate from the request manager.

In certain arrangements, the method further includes, in response to determining that the capacity of the storage node is available for running the second operation, granting the second sequencing request for the second operation of the specified second operation type.

In certain arrangements, the method further includes, in response to determining that the capacity of the storage node is not available for running the second operation, postponing granting the second sequencing request for the second operation of the specified second operation type.

In certain embodiments, a system for managing sequencing requests for storage node operations includes a memory and processing circuitry configured to run executable code out of the memory to receive a first sequencing request for a first operation of a specified first operation type at a request manager component of the executable code, and determine whether a capacity of the storage node is available for running the first operation by a first capacity manager component of the executable code for the specified first operation type. The first capacity manager component is provided by a storage client and implemented on the system separate from the request manager. The processing circuitry is further configured to run the executable code out of the memory, in response to determining that the capacity of the storage node is available for running the first operation, to grant the first sequencing request for the first operation of the specified first operation type. The processing circuitry is further configured to run the executable code out of the memory, in response to determining that the capacity of the storage node is not available for running the first operation, to postpone granting the first sequencing request for the first operation of the specified first operation type.

In certain arrangements, the processing circuitry is further configured to run the executable code out of the memory to receive a second sequencing request for a second operation of a specified second operation type at the request manager component, write a first persistent record of the first sequencing request to a first repository for the specified first operation type, and write a second persistent record of the second sequencing request to a second repository for the specified second operation type.

In certain arrangements, the processing circuitry is further configured to run the executable code out of the memory to determine whether capacity of the storage node is available for running the second operation by a second capacity manager component of the executable code for the specified second operation type. The second capacity manager component is provided by the storage client and implemented on the system separate from the request manager.

In certain embodiments, a computer program product is provided including a set of non-transitory, computer-readable media having instructions that, when executed by processing circuitry, cause the processing circuitry to perform a method including receiving a first sequencing request for a first operation of a specified first operation type at a request manager of a storage node and determining whether a capacity of the storage node is available for running the first operation by a first capacity manager for the specified first operation type. The first capacity manager is provided by a storage client and implemented on the storage node separate from the request manager. The method further includes, in response to determining that the capacity of the storage node is available for running the first operation, granting the first sequencing request for the first operation of the specified first operation type. The method further includes, in response to determining that the capacity of the storage node is not available for running the first operation, postponing granting the first sequencing request for the first operation of the specified first operation type.

Other features, functions, and aspects of the present disclosure will be evident from the Detailed Description that follows.

BRIEF DESCRIPTION OF THE DRAWINGS

The foregoing and other objects, features, and advantages will be apparent from the following description of embodiments of the present disclosure, as illustrated in the accompanying drawings, in which like reference characters refer to the same parts throughout the different views.

DETAILED DESCRIPTION

Techniques are disclosed herein for managing sequencing requests for storage node operations based on types of operations being sequenced. The disclosed techniques can manage sequencing requests for different types of operations, such as backup and recovery operations, replication operations, migration operations, and so on, in a manner that avoids overwhelming storage node capacity. The disclosed techniques can include receiving a sequencing request for an operation of a specified operation type at a request manager of a storage node and determining whether storage node capacity is available for running the operation by a capacity manager for the specified operation type, in which the capacity manager is provided by a storage client and implemented on the storage node separate from the request manager. In this way, throttling, limiting, and/or prioritization requirements of the operation of the specified operation type can be defined by the storage client in a manner agnostic to the request manager.

Figure 1:
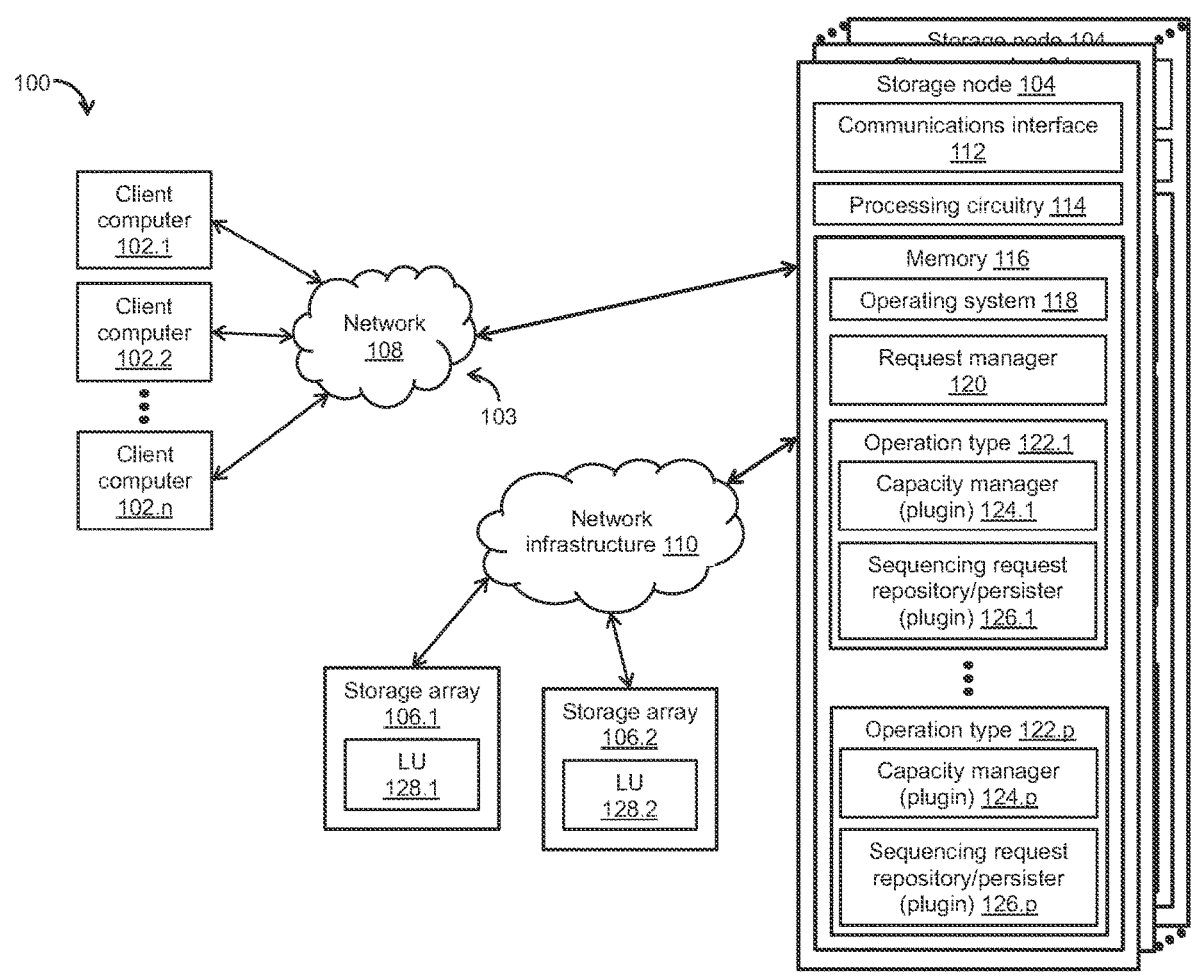
FIG. 1 is a block diagram of an exemplary storage cluster environment, in which techniques can be practiced for managing sequencing requests for storage node operations based on types of operations being sequenced.

FIG. 1 depicts an illustrative embodiment of an exemplary storage cluster environment 100, in which techniques can be practiced for managing sequencing requests for storage node operations based on types of operations being sequenced. As shown in FIG. 1, the storage cluster environment 100 can include a plurality of client computers ("storage clients") 102.1, 102.2, . . . , 102.n, a plurality of storage processors ("storage nodes") such as a storage node 104, one or more storage arrays 106.1, 106.2, and a communications medium 103 that includes at least one network 108. The plurality of storage clients 102.1, . . . , 102.n can be configured to provide, over the network 108, storage requests (e.g., small computer system interface (SCSI) commands, network file system (NFS) commands) to the storage node 104. Such storage requests (e.g., write IO requests, read IO requests, sequencing requests) can direct the storage node 104 to write, read, backup, recover, replicate, migrate, and so on, data pages, data blocks, data files, or any other suitable data objects to/from logical units (LUs), volumes (VOLs), file systems, and/or any other suitable storage targets, such as LUs 128.1, 128.2 maintained in the storage arrays 106.1, 106.2, respectively. The LUs 128.1, 128.2 can be stored to one or more hard disk drives (HDDs), solid state drives (SSDs), flash drives, and/or any other suitable storage device(s).

The communications medium 103 can be configured to interconnect the plurality of storage clients 102.1, . . . , 102.n with the storage node 104 to enable them to communicate and exchange data and/or control signaling. As shown in FIG. 1, the communications medium 103 can be illustrated as a "cloud" to represent different network topologies, such as storage area network (SAN) topologies, network attached storage (NAS) topologies, local area network (LAN) topologies, metropolitan area network (MAN) topologies, wide area network (WAN) topologies, and so on. As such, the communications medium 103 can include copper-based data communications devices and cabling, fiber optic devices and cabling, wireless devices, and so on, or any suitable combination thereof.

The storage node 104 can be connected directly to one or more of the storage arrays 106.1, 106.2 or via a network infrastructure 110, which can include an Ethernet network, an InfiniBand network, a fiber channel network, and/or any other suitable network. As shown in FIG. 1, the storage node 104 can include a communications interface 112, processing circuitry 114, and a memory 116. The communications interface 112 can include one or more of an Ethernet interface, an InfiniBand interface, a fiber channel interface, and/or any other suitable communications interface. The communications interface 112 can further include SCSI target adapters, network interface adapters, and/or any other suitable adapters for converting electronic, optical, and/or wireless signals received over the network 108 to a form suitable for use by the processing circuitry 114.

The memory 116 can include volatile memory, such as a random-access memory (RAM) cache 122 or any other suitable volatile memory, as well as persistent memory, such as a nonvolatile random-access memory (NVRAM) 124 or any other suitable persistent memory. The memory 116 can further include an operating system 118, such as a Linux operating system (OS), Unix OS, Windows OS, or any other suitable operating system. The memory 116 can store a variety of software constructs realized in the form of computer executable code and data (e.g., program instructions), which can be executed by the processing circuitry 114 to carry out the techniques and/or methods disclosed herein. Such software constructs can include a request manager framework configured to manage sequencing requests for storage node operations based on types of operations being sequenced. As shown in FIG. 1, the request manager framework can include a plurality of components (e.g., hardware, software, firmware), namely, a request manager 120, a plurality of capacity managers 124.1, . . . , 124.p for a plurality of operation types 122.1, . . . , 122.p, respectively, and a plurality of sequencing request repository/persisters 126.1, . . . , 126.p for the plurality of operation types 122.1, . . . , 122.p, respectively. The request manager 120 can be configured to expose core functionality of the request manager framework through a first application programming interface (API) for requesting capacity (e.g., processing, memory) of the storage node 104 to run an operation, as well as a second API for freeing or releasing the requested capacity of the storage node 104. The plurality of capacity managers 124.1, . . . , 124.p for the plurality of operation types 122.1, . . . , 122.p, respectively, can be configured to provide interfaces through which the request manager 120 can supply specific client implementations of capacity determinations. The plurality of sequencing request repository/persisters 126.1, . . . , 126.p for the plurality of operation types 122.1, . . . , 122.p, respectively, can be configured to provide interfaces through which the request manager 120 can load, save, and/or delete operation type-specific sequencing requests. The processing circuitry 114 can include one or more physical storage processors and/or storage engines configured to execute the specialized code and data as program instructions out of the memory 116, process storage requests (e.g., write IO requests, read IO requests, sequencing requests) issued by the respective storage clients 102.1, . . . , 102.n, and store data and/or metadata to the storage arrays 106.1, 106.2 in the storage cluster environment 100, which can be a clustered RAID environment.

In the context of the processing circuitry 114 being implemented using one or more storage processors executing specialized code and data, a computer program product can be configured to deliver all or a portion of the specialized code and data to the respective storage processor(s). Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective storage processor(s), the various techniques and/or methods disclosed herein.

Figure 2:
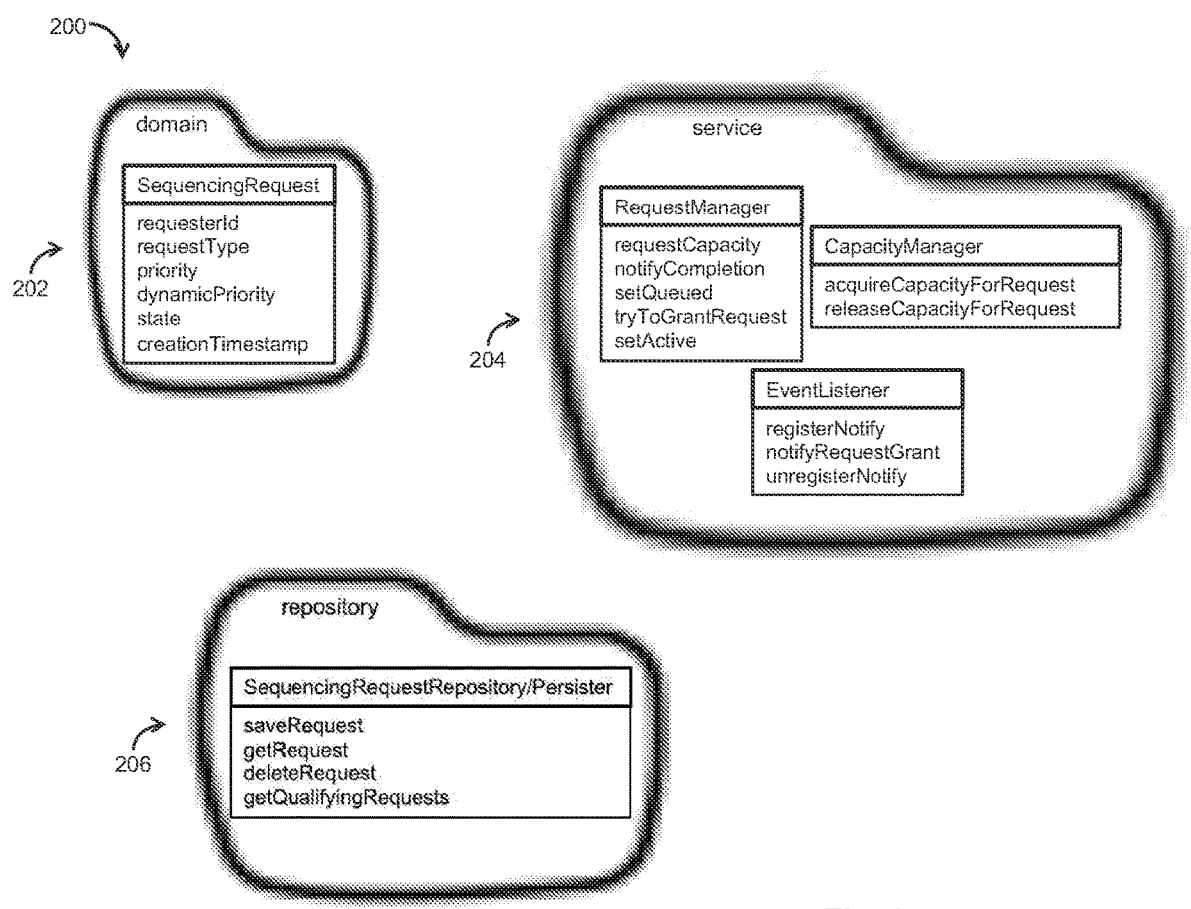
FIG. 2 is a diagram of an exemplary set of abstract classes included in an object model defined by a request manager framework implemented on a storage node within the storage cluster environment of FIG. 1.

As described herein, in the disclosed techniques, the request manager framework can manage sequencing requests for storage node operations based on the types of operations being sequenced. As such, the request manager framework can be configured to define an object model and a set of abstract classes and associated methods or functions to support the object model. FIG. 2 depicts an exemplary set of classes 200 that can support the object model defined by the request manager framework. As shown in FIG. 2, the set of classes 200 can include at least a domain class 202, a service class 204, and a repository class 206. The domain class 202 can provide a definition of a sequencing request ("SequencingRequest"), which can be issued by the storage clients 102.1, . . . , 102.n to the storage node 104 to request capacity to run an operation of a specified operation type. Each sequencing request can have a plurality of attributes or functions, such as a request ID ("requestId") function, a request type ("requestType") function, a priority attribute, a dynamic priority ("dynamicPriority") function, a state (e.g., queued, active) attribute, and a creation timestamp ("creationTimestamp") function. The service class 204 can provide a plurality of request manager ("RequestManager") functions, such as a request capacity ("requestCapacity") function, a notify completion ("notifyCompletion") function, a set queued ("setQueued") function, a try to grant request ("tryToGrantRequest") function, and a set active ("setActive") function. The service class 204 can further provide a plurality of capacity manager ("CapacityManager") functions, such as an acquire capacity for request ("acquireCapacityForRequest") function and a release capacity for request ("releaseCapacityForRequest") function, as well as a plurality of event listener ("EventListener") functions, such as a register notify ("registerNotify") function, a notify request grant ("notifyRequestGrant") function, and an unregister notify ("unregisterNotify") function. The repository class 206 can provide a plurality of sequencing request repository/persister ("SequencingRequestRepository/Persister") functions, such as a save request ("saveRequest") function, a get request ("getRequest") function, a delete request ("deleteRequest") function, and a get qualifying requests ("getQualifyingRequests") function.

During operation, the storage node 104 can manage sequencing requests for specified operation types, such as backup and recovery operations, replication operations, migration operations, and so on, in a manner that avoids overwhelming storage node capacity. Further, the plurality of storage clients 102.1, . . . , 102.n can provide, for each operation type, a capacity manager and sequencing request repository/persister as plugins (or APIs) into the request manager framework. For example, for the operation type 122.1, the capacity manager 124.1 and sequencing request repository/persister 126.1 can be provided as plugins (or APIs) into the request manager framework. In general, for the operation type 122.p, the capacity manager 124.p and sequencing request repository/persister 126.p can be provided as plugins (or APIs) into the request manager framework. The capacity managers 124.1, . . . , 124.p can be configured to define rules for managing storage node capacity for the operation types 122.1, . . . , 122.p, respectively. The sequencing request repository/persisters 126.1, . . . , 126.p can be configured to define capabilities and/or priorities for managing persistence of sequencing requests for the operation types 122.1, . . . , 122.p, respectively. The capacity managers 124.1, . . . , 124.p and the sequencing request repository/persisters 126.1, . . . , 126.p for the respective operation types 122.1, . . . , 122.p can be implemented on the storage node 104 separate from the request manager 120, which, as a result, can be agnostic with respect to the defined operation type-specific rules, capabilities, and/or priorities.

The disclosed techniques for managing sequencing requests for storage node operations based on types of operations being sequenced will be further understood with reference to the following illustrative example and FIGS. 3a-3d. In this example, it is assumed that a storage client 302 has provided, for an operation type "1", instances of a capacity manager 306 and a sequencing request repository/persister 308 as plugins (or APIs) into a request manager framework implemented on the storage node 104 of FIG. 1. For example, the operation type "1" can be a replication operation for replicating a source volume on the LU 128.1 of the storage array 106.1 to a target volume on the LU 128.2 of the storage array 106.2 (see FIG. 1). As such, the capacity manager 306 can be configured to define a first set of rules for managing storage node capacity for the operation type "1", i.e., volume replication. Likewise, the sequencing request repository/persister 308 can be configured to define a first set of capabilities and/or priorities for managing persistence of sequencing requests for the operation type "1", i.e., volume replication.

Figure 3A:
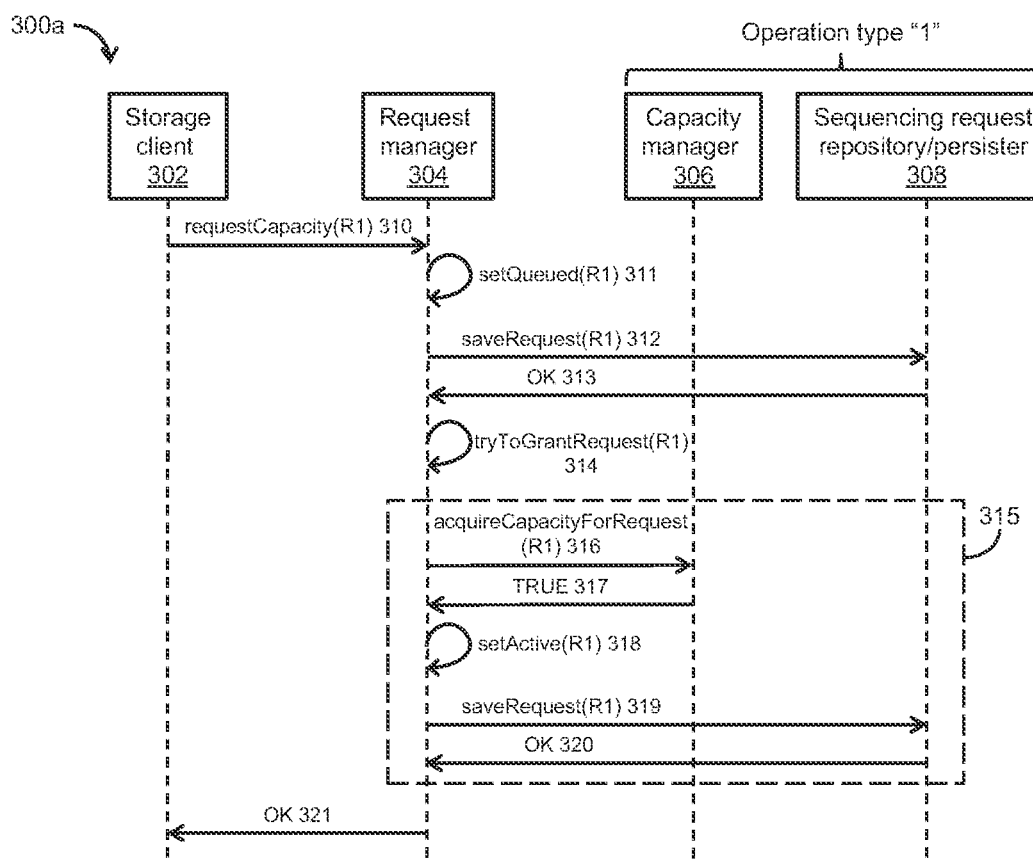
FIGS. 3a-3d are ladder diagrams illustrating exemplary scenarios for practicing techniques for managing sequencing requests for storage node operations based on types of operations being sequenced.

As shown in FIG. 3a, in this example, the storage client 302 issues a first sequencing request "R1" to initiate a requestCapacity(R1) function 310 of the request manager 304, thereby requesting capacity of the storage node 104 to run a first operation of the specified operation type "1" (volume replication). In response to the first sequencing request R1, the request manager 304 initiates a setQueued (R1) function 311 to set the state attribute of the first sequencing request R1 to "queued". The request manager 304 further initiates a saveRequest(R1) function 312 of the sequencing request repository/persister 308 to write a persistent record of the first sequencing request R1 (with the state attribute set to "queued") to a database (or flat file) repository of the storage node 104. For example, the database repository can be a local PostgreSQL database or any other suitable local or remote database. In response to writing the first sequencing request R1 to the database repository, the sequencing request repository/persister 308 sends an acknowledgement "OK" 313 to the request manager 304.

Having received the acknowledgement OK 313 from the sequencing request repository/persister 308, the request manager 304 initiates a tryToGrantRequest(R1) function 314 to determine whether to grant the first sequencing request R1 of the storage client 302. In response to initiation of the tryToGrantRequest(R1) function 314, a transaction 315 is initiated involving the request manager 304, the capacity manager 306, and the sequencing request repository/persister 308. As shown in FIG. 3a, in the transaction 315, the request manager 304 initiates an acquireCapacityForRequest(R1) function 316 of the capacity manager 306 to determine whether the requested capacity of the storage node 104 is available to run the first operation of the specified operation type "1". In this example, the capacity manager 306 indicates that the requested capacity of the storage node 104 is available by sending a positive response "TRUE" 317 to the request manager 304. In response to the positive response TRUE 317 from the capacity manager 306, the request manager 304 initiates a setActive(R1) function 318 to set the state attribute of the first sequencing request R1 to "active". The request manager 304 further initiates a saveRequest(R1) function 319 of the sequencing request repository/persister 308 to write a persistent record of the first sequencing request R1 (with the state attribute set to "active") to the database repository of the storage node 104. In response to writing the first sequencing request R1 to the database repository, the sequencing request repository/persister 308 sends an acknowledgement "OK" 320 to the request manager 304 to complete the transaction 315. Once the transaction 315 has completed, the request manager 304 sends an acknowledgement "OK" 321 to the storage client 302.

Figure 3B:
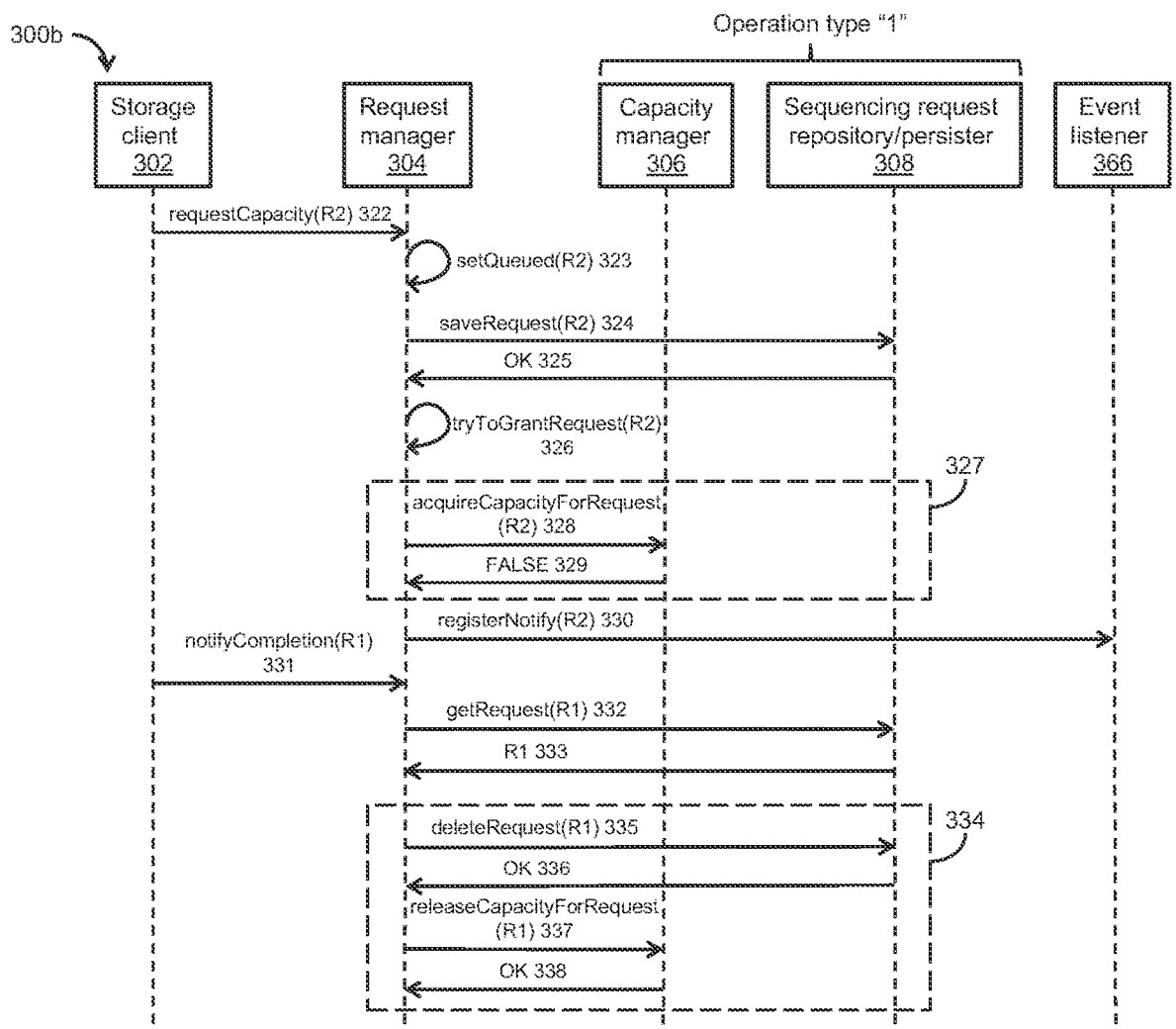

As shown in FIG. 3b, in this example, the storage client 302 issues a second sequencing request "R2" to initiate a requestCapacity(R2) function 322 of the request manager 304, thereby requesting capacity of the storage node 104 to run a second operation of the specified operation type "1" (volume replication). In response to the second sequencing request R2, the request manager 304 initiates a setQueued (R2) function 323 to set the state attribute of the second sequencing request R2 to "queued". The request manager 304 further initiates a saveRequest(R2) function 324 of the sequencing request repository/persister 308 to write a persistent record of the second sequencing request R2 (with the state attribute set to "queued") to the database repository of the storage node 104. In response to writing the second sequencing request R2 to the database repository, the sequencing request repository/persister 308 sends an acknowledgement "OK" 325 to the request manager 304.

Having received the acknowledgement OK 325 from the sequencing request repository/persister 308, the request manager 304 initiates a tryToGrantRequest(R2) function 326 to determine whether to grant the second sequencing request R2 of the storage client 302. In response to initiation of the tryToGrantRequest(R2) function 326, a transaction 327 is initiated involving the request manager 304, the capacity manager 306, and the sequencing request repository/persister 308. As shown in FIG. 3b, in the transaction 327, the request manager 304 initiates an acquireCapacityForRequest(R2) function 328 of the capacity manager 306 to determine whether the requested capacity of the storage node 104 is available to run the second operation of the specified operation type "1". In this example, the capacity manager 306 indicates that the requested capacity of the storage node 104 is currently not available by sending a negative response "FALSE" 329 to the request manager 304, thereby completing the transaction 327. Once the transaction 327 has completed, the request manager 304 initiates a registerNotify(R2) function 330 of an event listener 366 to register for notification that the second sequencing request R2 has been granted.

As shown in FIG. 3b, in this example, the storage client 302 initiates a notifyCompletion(R1) function 331 of the request manager 304 to provide notification that running of the first operation of the specified operation type "1" has completed. In response to the notification, the request manager 304 initiates a getRequest(R1) function 332 of the sequencing request repository/persister 308 to obtain the first sequencing request R1 from the database repository of the storage node 104, and the sequencing request repository/persister 308 sends an indication of the first sequencing request R1 333 to the request manager 304. Having received the indication of the first sequencing request R1 333, a transaction 334 is initiated involving the request manager 304, the capacity manager 306, and the sequencing request repository/persister 308. In the transaction 334, the request manager 304 initiates a deleteRequest(R1) 335 function of the sequencing request repository/persister 308 to remove the persistent record of the first sequencing request R1 from the database repository. Once the persistent record of the first sequencing request R1 has been removed, the sequencing request repository/persister 308 sends an acknowledgement "OK" 336 to the request manager 304. The request manager 304 further initiates a releaseCapacityForRequest (R1) function 337 of the capacity manager 306 to free or release the capacity of the storage node 104 used to run the first operation of the specified operation type "1". Once the capacity of the storage node 104 has been freed or released, the capacity manager 306 sends an acknowledgement "OK" 338 to the request manager 304 to complete the transaction 334.

Figure 3C:
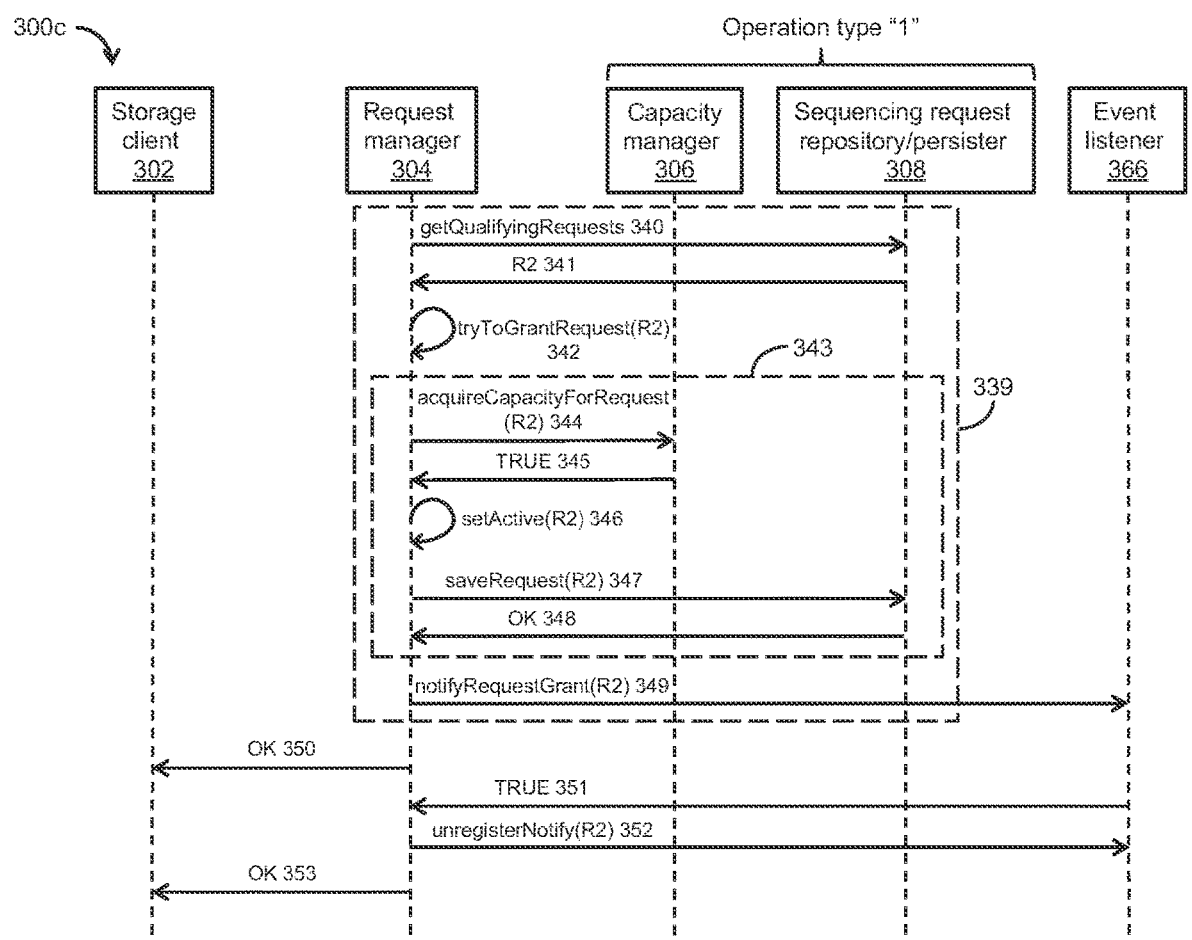

As shown in FIG. 3c, in this example, a transaction 339 is initiated involving the request manager 304, the capacity manager 306, the sequencing request repository/persister 308, and the event listener 366. In the transaction 339, the request manager 304 initiates a getQualifyingRequests function 340 of the sequencing request repository/persister 308 to obtain one or more indications of any queued sequencing requests remaining in the database repository, and the sequencing request repository/persister 308 sends an indication of the second sequencing request R2 341 to the request manager 304. Having received the indication of the second sequencing request R2 341 from the sequencing request repository/persister 308, the request manager 304 initiates a tryToGrantRequest(R1) function 342 to determine whether to grant the second sequencing request R2 of the storage client 302. In response to initiation of the tryToGrantRequest(R1) function 342, another transaction 343 is initiated involving the request manager 304, the capacity manager 306, and the sequencing request repository/persister 308. As shown in FIG. 3c, in the transaction 343, the request manager 304 initiates an acquireCapacityForRequest(R2) function 344 of the capacity manager 306 to determine whether the requested capacity of the storage node 104 is available to run the second operation of the specified operation type "1". In this example, the capacity manager 306 indicates that the requested capacity of the storage node 104 is available by sending a positive response "TRUE" 345 to the request manager 304. In response to the positive response TRUE 345 from the capacity manager 306, the request manager 304 initiates a setActive(R2) function 346 to set the state attribute of the second sequencing request R2 to "active". The request manager 304 further initiates a saveRequest(R2) function 347 of the sequencing request repository/persister 308 to write a persistent record of the second sequencing request R2 (with the state attribute set to "active") to the database repository of the storage node 104. In response to writing the second sequencing request R2 to the database repository, the sequencing request repository/persister 308 sends an acknowledgement "OK" 348 to the request manager 304 to complete the transaction 343. Once the transaction 343 has completed, the request manager 304 initiates a notifyRequestGrant(R2) function 349 of the event listener 366 for use in notifying the storage client 302 that the second sequencing request R2 has been granted, thereby completing the transaction 339.

As shown in FIG. 3c, in this example, once the transaction 339 has completed, the request manager 304 sends an acknowledgement "OK" 350 to the storage client 302, thereby indicating that the persistent record of the first sequencing request R1 has been removed from the database repository and the capacity of the storage node 104 used to run the first operation of the specified operation type "1" has been freed or released. In addition, the event listener 366 indicates that the second sequencing request R2 has been granted by sending a positive response "TRUE" 351 to the request manager 304. In response to the positive response TRUE 351 from the event listener 366, the request manager 304 initiates an unregisterNotify(R2) function 352 of the event listener 366 to remove its prior registration for event notification. The request manager 304 then sends an acknowledgement "OK" 353 to the storage client 302 to notify the storage client 302 that the second sequencing request R2 has been granted.

As described herein, the capacity manager 306 can be configured to define the first set of rules for managing storage node capacity for the operation type "1", i.e., volume replication, and the sequencing request repository/persister 308 can be configured to define the first set of capabilities and/or priorities for managing persistence of sequencing requests for the operation type "1", i.e., volume replication. In this example, it is assumed that the storage client 302 has further provided, for an operation type "2", instances of a capacity manager 367 (see FIG. 3d) and a sequencing request repository/persister 368 (see FIG. 3d) as plugins (or APIs) into the request manager framework implemented on the storage node 104 of FIG. 1. For example, the operation type "2" can be a migration operation for migrating a source volume on the LU 128.1 of the storage array 106.1 to a target volume on the LU 128.2 of the storage array 106.2. As such, the capacity manager 367 can be configured to define a second set of rules for managing storage node capacity for the operation type "2", i.e., volume migration. Likewise, the sequencing request repository/persister 368 can be configured to define a second set of capabilities and/or priorities for managing persistence of sequencing requests for the operation type "2", i.e., volume migration.

Figure 3D:
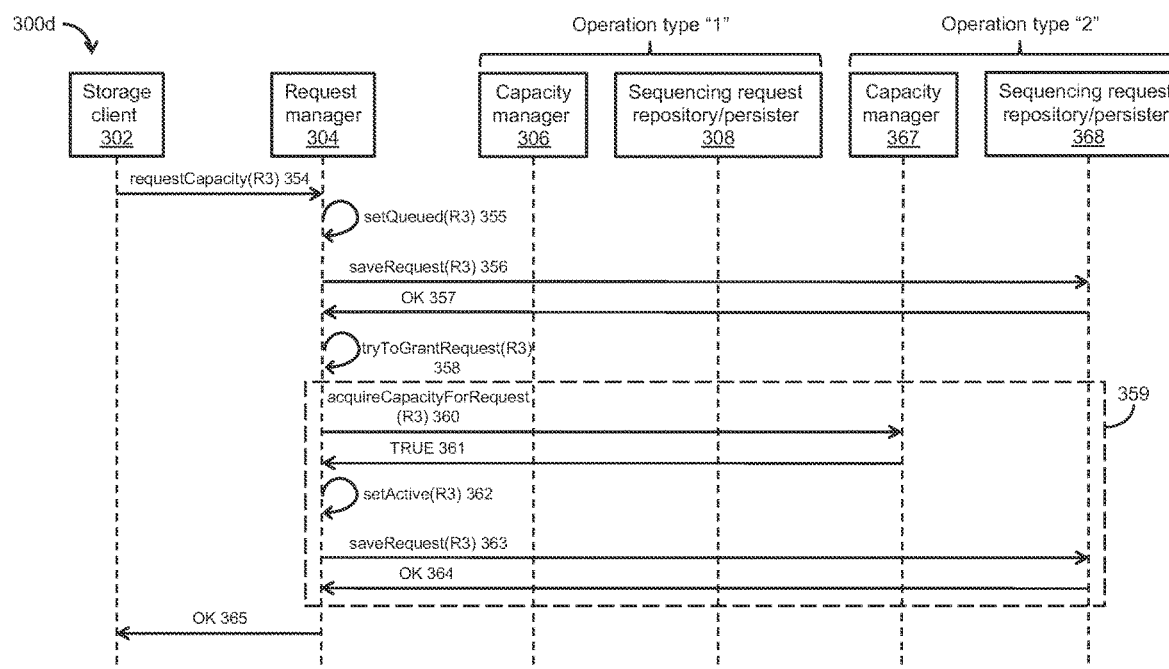

As shown in FIG. 3d, in this example, the storage client 302 issues a third sequencing request "R3" to initiate a requestCapacity(R3) function 354 of the request manager 304, thereby requesting capacity of the storage node 104 to run an operation of a specified operation type "2" (volume migration). In response to the third sequencing request R3, the request manager 304 initiates a setQueued(R3) function 355 to set the state attribute of the third sequencing request R3 to "queued". The request manager 304 further initiates a saveRequest(R3) function 356 of the sequencing request repository/persister 308 to write a persistent record of the third sequencing request R3 (with the state attribute set to "queued") to the database repository of the storage node 104. In response to writing the third sequencing request R3 to the database repository, the sequencing request repository/persister 308 sends an acknowledgement "OK" 357 to the request manager 304.

Having received the acknowledgement OK 357 from the sequencing request repository/persister 308, the request manager 304 initiates a tryToGrantRequest(R3) function 358 to determine whether to grant the third sequencing request R3 of the storage client 302. In response to initiation of the tryToGrantRequest(R3) function 358, a transaction 359 is initiated involving the request manager 304, the capacity manager 367, and the sequencing request repository/persister 368. As shown in FIG. 3d, in the transaction 359, the request manager 304 initiates an acquireCapacityForRequest(R3) function 360 of the capacity manager 367 to determine whether the requested capacity of the storage node 104 is available to run the operation of the specified operation type "2". In this example, the capacity manager 306 indicates that the requested capacity of the storage node 104 is available by sending a positive response "TRUE" 361 to the request manager 304. In response to the positive response TRUE 361 from the capacity manager 306, the request manager 304 initiates a setActive(R3) function 362 to set the state attribute of the third sequencing request R3 to "active". The request manager 304 further initiates a saveRequest(R1) function 363 of the sequencing request repository/persister 308 to write a persistent record of the third sequencing request R3 (with the state attribute set to "active") to the database repository of the storage node 104. In response to writing the third sequencing request R3 to the database repository, the sequencing request repository/persister 308 sends an acknowledgement "OK" 364 to the request manager 304 to complete the transaction 359. Once the transaction 359 has completed, the request manager 304 sends an acknowledgement "OK" 365 to the storage client 302. In this way, multiple different sets of rules can be defined in a storage node for managing storage node capacity, and multiple different sets of capabilities and/or priorities can be defined in the storage node for managing persistence of sequencing requests, based on types of operations being sequenced.

Figure 4:
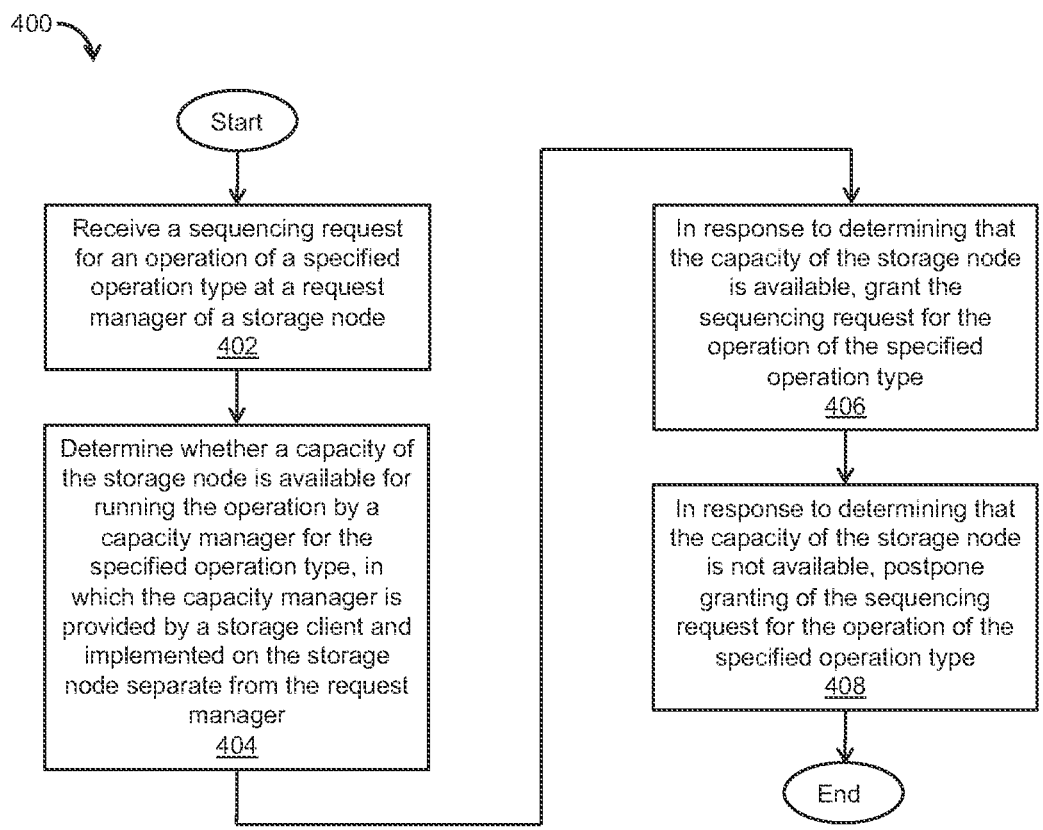
FIG. 4 is a flow diagram of an exemplary method of managing sequencing requests for storage node operations based on types of operations being sequenced.

An exemplary method 400 of managing sequencing requests for storage node operations based on types of operations being sequenced is described below with reference to FIG. 4. As depicted in block 402, a sequencing request for an operation of a specified operation type is received at a request manager of a storage node. As depicted in block 404, a determination is made as to whether a capacity of the storage node is available for running the operation by a capacity manager for the specified operation type, in which the capacity manager is provided by a storage client and implemented on the storage node separate from the request manager. As depicted in block 406, in response to determining that the capacity of the storage node is available, the sequencing request for the operation of the specified operation type is granted. As depicted in block 408, in response to determining that the capacity of the storage node is not available, granting of the sequencing request for the operation of the specified operation type is postponed.

Having described the above illustrative embodiments, other alternative embodiments or variations may be made and/or practiced. For example, it was described herein with reference to FIG. 1 that the capacity managers 124.1, . . . , 124.p can be configured to define rules for managing storage node capacity for the operation types 122.1, . . . , 122.p, respectively, and the sequencing request repository/persisters 126.1, . . . , 126.p can be configured to define capabilities and/or priorities for managing persistence of sequencing requests for the operation types 122.1, . . . , 122.p, respectively. In one or more alternative embodiments, such rules for managing storage node capacity can be defined to enforce specified limits (e.g., static, dynamic) on total numbers of sequencing requests issued by storage clients based on the types of operations being sequenced. Further, such capabilities and/or priorities for managing persistence of sequencing requests can be defined to include, based on the types of operations, certain priorities for granting sequencing requests that combine their creation timestamps with priority schema (e.g., high, medium, low), which can have dynamic priority levels that escalate over time. It is noted that such rules, capabilities, and/or priorities can be defined based on any suitable sets of variables or parameters, which can be provided as input from storage clients and/or relate to the state of a storage node or system.

It was further described herein that sequencing requests can have a plurality of attributes or functions, such as a request ID ("requestId") function, a request type ("requestType") function, a priority attribute, a dynamic priority ("dynamicPriority") function, a state (e.g., queued, active) attribute, and a creation timestamp ("creationTimestamp") function. In one or more alternative embodiments, such sequencing requests can further include certain operation type-specific details that storage clients may wish to use in making their sequencing decisions. For example, such operation type-specific details may be provided as a JSON in a database record and employed by a capacity manager for a specified operation type.

It was further described herein with reference to FIG. 1 that the disclosed request manager framework can be implemented on the storage node 104 within the storage cluster environment 100. It is to be understood, however, that the disclosed systems, methods, and/or techniques for managing sequencing requests can be implemented in various manners and are not limited to the illustrative embodiments of storage clusters described herein. Rather, they can be applied to any scenario where access to finite resources need to be managed.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of managing sequencing requests for storage node operations, comprising:

receiving, at a storage node from a storage client, a first capacity manager plugin for a request manager framework implemented on the storage node, the first capacity manager plugin defining rules for managing a capacity of the storage node for a specified first operation type, the request manager framework including a request manager component;

receiving a first sequencing request for a first operation of the specified first operation type at the request manager component of the request manager framework; and initiating a first transaction involving at least the request manager component and the first capacity manager plugin, the first transaction comprising:

determining, by the first capacity manager plugin, whether a capacity of the storage node is available for running the first operation of the specified first operation type, the request manager framework implementing the first capacity manager plugin separate from the request manager component, which is agnostic to the defined rules for managing the capacity of the storage node for the specified first operation type;

in response to the capacity of the storage node being determined available for running the first operation, granting, by the request manager component, the first sequencing request for the first operation of the specified first operation type; and in response to the capacity of the storage node being determined not available for running the first operation, postponing granting, by the request manager component, the first sequencing request for the first operation of the specified first operation type.

2. The method of claim 1 further comprising:
receiving, at the storage node from the storage client, a first sequencing request persister plugin for the request manager framework, the first sequencing request persister plugin defining capabilities and/or priorities for managing persistence of sequencing requests for the specified first operation type, the request manager framework being further agnostic to the defined capabilities and/or priorities for managing the persistence of sequencing requests for the specified first operation type, the first transaction further involving the first sequencing request persister plugin, the first transaction further comprising:
in response to the capacity of the storage node being determined available for running the first operation, initiating, by the request manager component, writing a persistent record of the first sequencing request to a repository for the specified first operation type by the first sequencing request persister plugin.

3. The method of claim 1 further comprising:
receiving a second sequencing request for a second operation of the specified first operation type at the request manager component of the request manager framework.

4. The method of claim 3 further comprising: initiating, by the request manager component, writing a persistent record of the second sequencing request to a repository for the specified first operation type by the first sequencing request persister plugin.

5. The method of claim 4 further comprising:
initiating, by the request manager component, releasing the capacity of the storage node for running the first operation by the first capacity manager plugin for the specified first operation type by the first capacity manager plugin.

6. The method of claim 5 further comprising:
in response to the capacity of the storage node for running the first operation being released, initiating a second transaction involving at least the request manager component and the first capacity manager plugin, the second transaction comprising:
initiating, by the request manager component, obtaining the persistent record of the second sequencing request from the repository for the specified first operation type by the first sequencing request persister plugin.

7. The method of claim 6 wherein the second transaction further comprises:
determining, by the first capacity manager plugin, whether a capacity of the storage node is available for running the second operation of the specified first operation type.

8. The method of claim 7 wherein the second transaction further comprises:
in response to that the capacity of the storage node being determined available for running the second operation, granting, by the request manager component, the second sequencing request for the second operation of the specified first operation type.

9. The method of claim 8 wherein the second transaction further comprises:
in response to the capacity of the storage node is being determined not available for running the second operation, postponing granting, by the request manager component, the second sequencing request for the second operation of the specified first operation type.

10. The method of claim 1 further comprising:
receiving, at the storage node from the storage client, a second capacity manager plugin for the request manager framework, the second capacity manager plugin defining rules for managing a capacity of the storage node for a specified second operation type, the request manager component being further agnostic to the defined rules for manacling the capacity of the storage node for the specified second operation type; and
receiving a second sequencing request for a second operation of the specified second operation type at the request manager component of the request manager framework.

11. The method of claim 10 further comprising:
receiving, at the storage node from the storage client, a second sequencing request persister plugin for the request manager framework, the second sequencing request persister plugin defining capabilities and/or priorities for managing persistence of sequencing requests for the specified second operation type, the request manager framework being further agnostic to the defined capabilities and/or priorities for managing the persistence of sequencing requests for the specified second operation type, the first transaction further comprising:
initiating, by the request manager component, writing a first persistent record of the first sequencing request to a first repository for the specified first operation type by the first sequencing request persister plugin; and
initiating a second transaction involving at least the request manager component and the second sequencing request persister plugin, the second transaction comprising:
initiating, by the request manager component, writing a second persistent record of the second sequencing request to a second repository for the specified second operation type by the second sequencing request persister plugin.

12. The method of claim 10 further comprising:
initiating a second transaction involving at least the request manager component and the second capacity manager plugin, the second transaction comprising:
determining, by the second capacity manager plugin, whether capacity of the storage node is available for running the second operation of the specified second operation type, the request manager framework implementing the second capacity manager plugin separate from the request manager component, which is agnostic to the defined rules for managing the capacity of the storage node for the specified second operation type.

13. The method of claim 12 wherein the second transaction further comprises:
in response to the capacity of the storage node being determined available for running the second operation, granting, by the request manager component, the second sequencing request for the second operation of the specified second operation type.

14. The method of claim 13 wherein the second transaction further comprises:
in response to the capacity of the storage node is being determined not available for running the second operation, postponing granting, by the request manager component, the second sequencing request for the second operation of the specified second operation type.

15. A system for managing sequencing requests for storage node operations, comprising:
a memory; and
processing circuitry configured to run executable code out of the memory to:
receive, at a storage node, from a storage client, a first capacity manager plugin for a request manager framework implemented on the storage node, the first capacity manager plugin defining rules for managing a capacity of the storage node for a specified first operation type, the request manager framework including a request manager component;
receive a first sequencing request for a first operation of the specified first operation type at the request manager component of the request manager framework; and
initiate a first transaction involving at least the request manager component and the first capacity manager plugin, the first transaction comprising:
determine, by the first capacity manager plugin, whether a capacity of the storage node is available for running the first operation of the specified first operation type, the request manager framework implementing the first capacity manager plugin separate from the request manager component, which is agnostic to the defined rules for managing the capacity of the storage node for the specified first operation type;
in response to the capacity of the storage node being determined available for running the first operation, grant, by the request manager component, the first sequencing request for the first operation of the specified first operation type; and
in response to the capacity of the storage node being determined not available for running the first operation, postpone granting, by the request manager component, the first sequencing request for the first operation of the specified first operation type.

16. The system of claim 15 wherein the processing circuitry is further configured to run the executable code out of the memory to:
receive, at the storage node from the storage client, a second capacity manager plugin for the request manager framework, the second capacity manager plugin defining rules for managing a capacity of the storage node for a specified second operation type, the request manager component being further agnostic to the defined rules for managing the capacity of the storage node for the specified second operation type; and
receive a second sequencing request for a second operation of the specified second operation type at the request manager component of the request manager framework;
receive, at the storage node from the storage client, a second sequencing request persister plugin for the request manager framework, the second sequencing request persister plugin defining capabilities and/or priorities for managing persistence of sequencing requests for the specified second operation type, the request manager framework being further agnostic to the defined capabilities and/or priorities for managing the persistence of sequencing requests for the specified second operation type, the first transaction further comprising:
initiate, by the request manager component, writing a first persistent record of the first sequencing request to a first repository for the specified first operation type by the first sequencing request persister plugin; and
initiate a second transaction involving at least the request manager component and the second sequencing request persister plugin, the second transaction comprising:
initiate, by the request manager component, writing a second persistent record of the second sequencing request to a second repository for the specified second operation type by the second sequencing request persister plugin.

17. The system of claim 16 wherein the processing circuitry is further configured to run the executable code out of the memory to:
initiate a third transaction involving at least the request manager component and the second capacity manager plugin, the third transaction comprising:
determine, by the second capacity manager plugin, whether capacity of the storage node is available for running the second operation of the specified second operation type, the request manager framework implementing the second capacity manager plugin separate from the request manager component, which is agnostic to the defined rules for managing the capacity of the storage node for the specified second operation type.

18. A computer program product including a set of non-transitory, computer-readable media having instructions that, when executed by processing circuitry, cause the processing circuitry to perform a method comprising:
receiving, at a storage node from a storage client, a first capacity manager plugin for a request manager framework implemented on the storage node, the first capacity manager plugin defining rules for managing a capacity of the storage node for a specified first operation type, the request manager framework including a request manager component;
receiving a first sequencing request for a first operation of the specified first operation type at the request manager component of the request manager framework; and
initiating a first transaction involving at least the request manager component and the first capacity manager plugin, the first transaction comprising:
determining, by the first capacity manager plugin, whether a capacity of the storage node is available for running the first operation of the specified first operation type, the request manager framework implementing the first capacity manager plugin separate from the request manager component, which is agnostic to the defined rules for managing the capacity of the storage node for the specified first operation type;
in response to the capacity of the storage node being determined available for running the first operation, granting, by the request manager component, the first sequencing request for the first operation of the specified first operation type; and
in response to the capacity of the storage node being determined not available for running the first operation, postponing granting, by the request manager component, the first sequencing request for the first operation of the specified first operation type.

19. The computer program product of claim 18 wherein the method further comprises:
- receiving, at the storage node from the storage client, a second capacity manager plugin for the request manager framework, the second capacity manager plugin defining rules for managing a capacity of the storage node for a specified second operation type, the request manager component being further agnostic to the defined rules for managing the capacity of the storage node for the specified second operation type;
- receiving a second sequencing request for a second operation of the specified second operation type at the request manager component of the request manager framework;
- receiving, at the storage node from the storage client, a second sequencing request persister plugin for the request manager framework, the second sequencing request persister plugin defining capabilities and/or priorities for managing persistence of sequencing requests for the specified second operation type, the request manager framework being further agnostic to the defined capabilities and/or priorities for managing the persistence of sequencing requests for the specified second operation type, the first transaction further comprising:
  - initiating, by the request manager component, writing a first persistent record of the first sequencing request to a first repository for the specified first operation type by the first sequencing request persister plugin; and
- initiating a second transaction involving at least the request manager component and the second sequencing request persister plugin, the second transaction comprising:
  - initiating, by the request manager component, writing a second persistent record of the second sequencing request to a second repository for the specified second operation type by the second sequencing request persister plugin.

20. The computer program product of claim 19 wherein the method further comprises:
- initiating a second transaction involving at least the request manager component and the second capacity manager plugin, the second transaction comprising:
  - determining, by the second capacity manager plugin, whether capacity of the storage node is available for running the second operation of the specified second operation type, the request manager framework implementing the second capacity manager plugin separate from the request manager component, which is agnostic to the defined rules for managing the capacity of the storage node for the specified second operation type.

* * * * *